3,651,060
1,1'-ETHYLENE-2,2'-BIPYRIDLIUM SALTS
George Henry Lang, Manchester, England, assignor to Imperial Chemical Industries Limited, London, England
No Drawing. Filed Oct. 2, 1969, Ser. No. 863,370
Claims priority, application Great Britain, Oct. 4, 1968, 47,224/68
Int. Cl. C07d 51/76
U.S. Cl. 260—250 R    5 Claims

ABSTRACT OF THE DISCLOSURE

Herbicidal 1,1'-ethylene-2,2'-bipyridylium salts are obtained from 2,2'-bipyridyls by heating with an acid in ethylene glycol.

---

This invention relates to a process for the manufacture of 1,1'-ethylene-2,2'-bipyridylium salts.

Herbicidal 1,1'-ethylene-2,2'-bipyridylium salts, prepared by quaternising 2,2'-bipyridyl with ethylene dibromide or dichloride, are known. The dibromide herbicide is however expensive, particularly since the two bromine atoms which contribute nothing to the herbicidal action constitute a large part of the molecule, while manufacture of the dichloride herbicide is not attractive owing to corrosion difficulties which are especially severe at the high temperatures necessary to react ethylene dichloride and 2,2'-bipyridyl. The present invention provides a process which is less corrosive than the ethylene dichloride process and leads to bipyridylium salts which contain comparatively small proportions of expensive, herbicidally inactive anions. The process can however also be used to prepare the corresponding bipyridylium dibromide and dichloride.

According to the invention there is provided an improved process for the manufacture of 1,1'-ethylene-2,2'-bipyridylium salts which comprises heating a 2,2'-bipyridyl, ethylene glycol, and an acid.

As 2,2'-bipyridyls there are mentioned not only 2,2'-bipyridyl itself but also alkyl substituted 2,2'-bipyridyls for example, 5,5'-dimethyl-2,2'-bipyridyl and 4,4'-dimethyl-2,2'-bipyridyl.

As acids there are mentioned for example halides such as hydrogen chloride and hydrogen bromide and oxoacids such as sulphuric, phosphoric and boric acids.

The acids may be added as free acids or may be in the form of their salts with the 2,2'-bipyridyl.

The ethylene glycol may if desired be used wholly or partially in the form of an ethylene glycol ester such as ethylene carbonate. In such cases, depending upon for example the strength of the acid from which the ethylene glycol ester is derived, the bipyridylium salt obtained may contain at least in part the anion of this acid.

The process may be carried out for example by heating the bipyridyl with 2 equivalents of the acid in excess of ethylene glycol at temperatures from 100 to 250° C., and preferably from 160 to 210° C.

The reaction mixture can then be used after dilution with water as a herbicide or the 1,1-ethylene-2,2'-bipyridylium salt may be isolated by evaporation to remove the excess ethylene glycol and water, followed by extraction of the residue with absolute ethanol to remove unreacted 2,2'-bipyridyl or its salt. Alternatively as the diluted reaction mixture normally contains some unchanged 2,2'-bipyridyl which can be reused in the process after recovery, the aqueous solution can be neutralised to pH 6–8 and then extracted with a water-immiscible solvents such as toluene to remove 2,2'-bipyridyl.

The invention is illustrated but not limited by the following examples in which all parts and percentages are by weight unless otherwise stated.

EXAMPLE 1

5 parts of 2,2'-bipyridyl, 20 parts of ethylene glycol and 5.5 parts of 98% sulphuric acid are heated at 185–195° C. for 1 hour. 22 parts of ethylene glycol are then added and the heating is continued for a further 3½ hours. The mixture is then cooled, diluted with water and filtered from a small amount of precipitate. The solution contains 3.0 parts of 1,1'-ethylene-2,2'-bipyridylium ion as sulphate. This is equivalent to 51% conversion based on the 2,2'-bipyridyl. The solution is evaporated under vacuum in a rotary evaporator and the residue is washed with absolute ethanol. The fawn coloured residual solid is 1,1'-ethylene-2,2'-bipyridylium bis bisulphate.

EXAMPLE 2

5 parts of 2,2'-bipyridyl, 40 parts of ethylene glycol and 10 parts of 85% phosphoric acid are heated at 185–190° C. for 18½ hours. The mixture is diluted with water and filtered to give a solution containing 2.05 parts of 1,1'-ethylene-2,2'-bipyridylium ion as phosphate. This is equivalent to 34.8% conversion.

EXAMPLE 3

1.6 parts of 2,2'-bipyridyl, 5 parts of ethylene glycol and 4.5 parts of 47% hydrobromic acid are heated in a sealed tube at 180° C. for 12 hours. The solution, after diluting with water and filtering off some insoluble material, contains 0.3 part of 1,1'-ethylene-2,2'-bipyridylium ion as dibromide.

EXAMPLE 4

1.6 parts of 2,2'-bipyridyl, 4 parts of ethylene glycol and 3.8 parts of 36% hydrochloric acid are treated as in Example 3. The filtered solution contains 0.22 part of 1,1'-ethylene-2,2'-bipyridylium ion as dichloride.

EXAMPLE 5

5 parts of 2,2'-bipyridyl, 5 parts of ethylene carbonate, 20 parts of nitrobenzene and 5.5 parts of 98% sulphuric acid are heated at 195° C. for 16 hours. The product is extracted with water, the nitrobenzene layer is separated and the aqueous extract is filtered. The filtered solution contains 1.8 parts of 1,1'-ethylene-2,2'-bipyridylium ion as sulphate. This is equivalent to 31% conversion.

EXAMPLE 6

Proceeding as described in Example 5 but using 10 parts of 85% phosphoric acid instead of sulphuric acid, the filtered solution contains 2.0 parts of 1,1'-ethylene-2,2'-bipyridylium ion as phosphate. This is equivalent to 34% conversion.

EXAMPLE 7

2,2'-bipyridyl diacid phosphate $(C_5H_4N)_2 2H_3PO_4$ is made from 51 parts of 2,2'-bipyridyl and 77 parts of 85% phosphoric acid in 200 parts of ethanol by warmning on a steam bath, cooling, filtering the cold mixture and drying at 60–70° C.

3.5 parts of this 2,2'-bipyridyl phosphate, 20 parts of ethylene glycol and 1.2 parts of ethylene carbonate are heated at 192–200° C. for 18 hours. The product is then cooled, diluted with water and filtered. The resultant solution contains 0.9 part of 1,1'-ethylene-2,2'-bipyridylium ion as phosphate. This is equivalent to a 48% conversion.

EXAMPLE 8

Proceeding as described in Example 7 but omitting the ethylene carbonate gives a solution containing 0.75 part of 1,1'-ethylene-2,2'-bipyridylium ion as phosphate. This is equivalent to a 39% conversion.

EXAMPLE 9

2,2'-bipyridyl sulphate $(C_5H_4N)_2 \cdot H_2SO_4$ is made from 50 parts of 2,2'-bipyridyl in 200 parts of ethanol by dripping in 48 parts of 65% sulphuric acid, then heating on a steam bath for 1 hour to complete the reaction. The mixture is cooled, filtered and the filter cake dried at 60–70° C.

2.5 parts of this 2,2'-bipyridyl sulphate and 20 parts of ethylene glycol are heated at 190–210° C. for 21 hours. The product is cooled, diluted with water and filtered. The resultant solution contains 0.8 part of 1,1'-ethylene 2,2'-bipyridylium ion as sulphate. This is equivalent to 43.5% conversion.

EXAMPLE 10

1.6 parts of 2,2'-bipyridyl, 20 parts of ethylene glycol and 2.5 parts of boric acid are heated in a sealed tube at 200° C. for 12 hours. The solution obtained by dilution with water, after filtering off some insoluble material, contains 0.06 part of 1,1'-ethylene-2,2'-bipyridylium ion as borate.

We claim:
1. A process for the manufacture of a 1,1'-ethylene-2,2'-bipyridylium salt which consists essentially of heating a 2,2'-bipyridyl, ethylene glycol, and an acid selected from the group consisting of sulphuric acid and phosphoric acid at a temperature between 100° C. and 250° C. using an excess of said ethylene glycol.
2. A process as claimed in claim 1 wherein the 2,2'-bipyridyl is 2,2'-bipyridyl itself.
3. A process as claimed in claim 1 wherein the acid is sulphuric acid.
4. A process as claimed in claim 1 wherein the acid is used in the form of its salt with the 2,2'-bipyridyl.
5. A process as claimed in claim 1 wherein there is used two equivalents of acid for each mol. of bipyridyl.

References Cited

UNITED STATES PATENTS 2,823,987   2/1958   Fielden et al. ____ 260—294.8 X

FOREIGN PATENTS 1,087,052   10/1967   Great Britain _____ 260—296

ALAN L. ROTMAN, Primary Examiner

U.S. Cl. X.R.

71—92; 260—296 D